United States Patent [19]
Tomohiro et al.

[11] Patent Number: 5,561,586
[45] Date of Patent: Oct. 1, 1996

[54] ELECTRONIC DEVICE WITH A CAPACITY

[75] Inventors: Takashi Tomohiro; Hiromichi Tokuda, both of Nagaokakyo, Japan

[73] Assignee: Murata Manufacturing Co, Ltd., Nagaokakyo, Japan

[21] Appl. No.: 398,449

[22] Filed: Mar. 3, 1995

[30] Foreign Application Priority Data

Mar. 4, 1994 [JP] Japan ................................... 6-034332

[51] Int. Cl.$^6$ ................................................. H01G 4/005
[52] U.S. Cl. .................. 361/303; 361/306.1; 361/308.1; 361/310; 333/172; 333/186; 338/312
[58] Field of Search ................................... 361/303, 313, 361/321.1, 321.2, 321.3, 321.4, 321.5, 308.1, 306.1, 766, 782, 821, 811, 310; 333/172, 176, 178, 185; 174/52.6; 338/204, 264, 266, 277, 306-313, 318, 332

[56] References Cited

U.S. PATENT DOCUMENTS 4,665,465  5/1987  Tanabe ................................ 361/306
5,051,712  9/1991  Naito et al. ........................... 333/185
5,084,694  1/1992  Kikuchi et al. ....................... 338/308
5,179,366  1/1993  Wagner ................................ 338/313
5,420,553  5/1995  Sakamoto et al. .................... 333/172

Primary Examiner—Leo P. Picard
Assistant Examiner—Anthony Dinkins
Attorney, Agent, or Firm—Burns, Doane, Swecker & Mathis, LLP

[57] ABSTRACT

An electronic device which has, on a rectangular insulating substrate, an input electrode and an output electrode, grounding electrodes and a conductor for electrically connecting the input electrode and the output electrode. The input electrode and the output electrode are disposed on both ends of the substrate. The grounding electrodes are disposed on side surfaces of the substrate in the center, and the conductor is disposed on an upper surface of the substrate. The conductor is a conductor with a high conductivity, a resistor or a coil. A capacity is generated between the conductor and the grounding electrode. If the conductor is a resistor, an RC circuit is formed.

15 Claims, 3 Drawing Sheets

ELECTRONIC DEVICE WITH A CAPACITY

BACKGROUND OF THE INVENTION

1. Field of the Invention

The present invention relates to an electronic device, and more particularly, to an electronic device which has a capacity.

2. Description of Related Art

FIGS. 8 through 10 show a conventional electronic device with a capacity. A rectangular insulating substrate 21 has an internal grounding conductor 25. An input electrode 22 and an output electrode 23 are provided on both ends (extending from shorter side surfaces to an upper and a lower surface) of the substrate 21 respectively. On longer side surfaces of the substrate 21, grounding electrodes 24a and 24b are provided in the center respectively. On the upper surface of the substrate 21, an external conductor 26 (a conductor with a high conductivity, a resister, a coil conductor or the like) is provided to electrically connect the input electrode 22 and the output electrode 23 to each other. In this structure, a capacity is generated between the internal grounding electrode 25 and the external conductor 26. A method of producing this electronic device requires a process of forming the internal grounding conductor 25 on an insulating sheet and a process of laminating the insulating sheet with the conductor 25 and other insulating sheets to make the insulating substrate 21.

In order to certainly obtain a capacity between the internal grounding conductor 25 and the external conductor 26, the internal grounding conductor 25 and the external conductor 26 should be located close to each other. Therefore, the internal grounding conductor 25 is located out of the center with respect to the thickness dimension of the substrate 21, and the external conductor 26 is formed on a surface closer to the internal grounding conductor 25. Accordingly, in forming the external conductor 26 on the substrate 21, it is necessary to distinguish the face (upper surface in FIGS. 8, 9 and 10) which is closer to the internal grounding conductor 25 from the reverse side.

SUMMARY OF THE INVENTION

An object of the present invention is to provide an electronic device which does not require distinguishing the face from the reverse side of an insulating substrate in forming an external conductor on the insulating substrate and accordingly is advantageous to mass production.

In order to attain the object, an electronic device according to the present invention comprises: an insulating substrate; an input electrode and an output electrode disposed on a surface of the substrate apart from each other; a grounding electrode disposed on the surface of the substrate between the input electrode and the output electrode at intervals thereamong; and a conductor for electrically connecting the input electrode and the output electrode to each other. The conductor is disposed on the surface of the substrate, and a capacity is generated between the conductor and the grounding electrode.

The conductor is, for example, a conductor with a high conductivity, a resistor or a coil conductor. The insulating substrate, the grounding electrode and the conductor with a high conductivity form a through capacitor. The insulating substrate, the grounding electrode and the resistor form a capacitor, and the capacitor and the resistance of the resistor form an RC circuit. The insulating substrate, the grounding electrode and the coil conductor form a capacitor, and the capacitor and the inductance of the coil conductor form an LC circuit.

According to the present invention, the electronic device has no internal conductors inside the insulating substrate, and a process of forming an internal conductor is eliminated from a method of producing the electronic device. The insulating substrate has no differences between an upper surface and a lower surface, and the conductor can be formed on either of the surfaces. Thus, the electronic device can be produced at low cost and is advantageous to mass production.

Moreover, since the electronic device has no internal conductors, there is no fear that the inductance of an internal conductor will degrade the high frequency characteristic of the electronic device. Therefore, the electronic device has a good electric characteristic in a high frequency area.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Preferred embodiments of the present invention are described with reference to the accompanying drawings.

First Embodiment: FIGS. 1–4

A first embodiment of the present invention is an electronic device which has a resistor on the surface of an insulating substrate.

Figure 1:
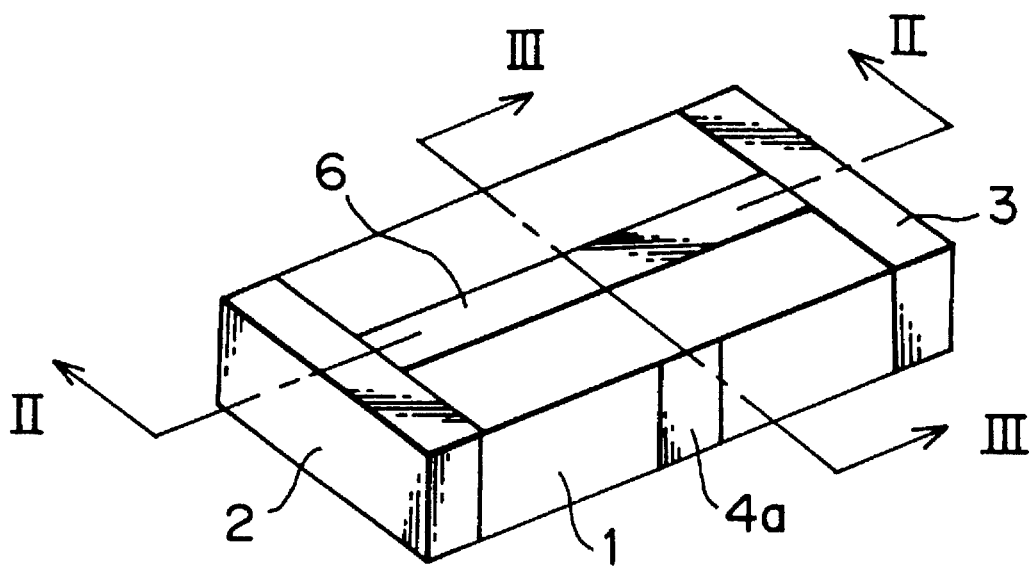
FIG. 1 is a perspective view of an electronic device which is a first embodiment of the present invention.
Figure 2:
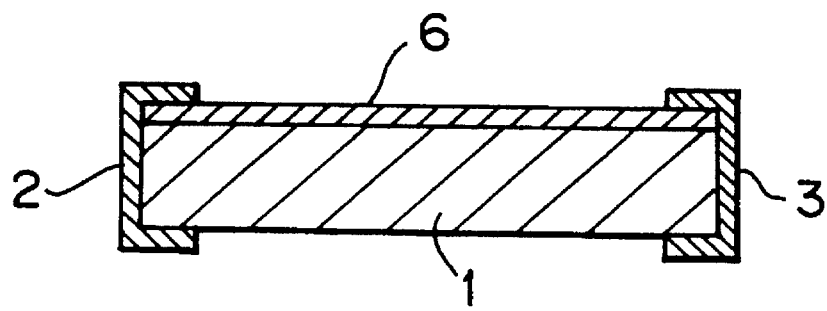
FIG. 2 is a sectional view of the electronic device of FIG. 1, taken along the line II—II.
Figure 3:
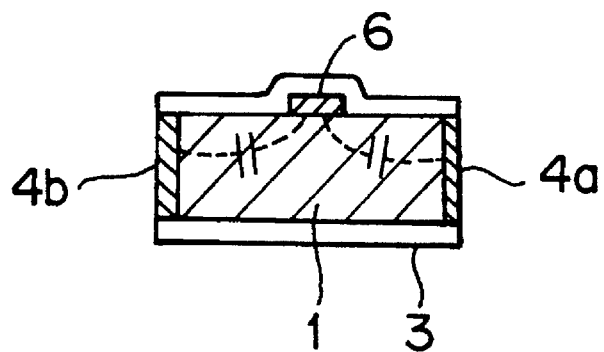
FIG. 3 is a sectional view of the electronic device of FIG. 1, taken along the line III—III.

FIGS. 1 through 3 show the electronic device of the first embodiment. A rectangular insulating substrate 1 has an input electrode 2 and an output electrode 3 on both ends (extending from shorter side surfaces to an upper and a lower surface) respectively. On longer side surfaces of the substrate 1, grounding electrodes 4a and 4b are provided in the center. On the upper surface of the substrate 1, a resistor 6 which electrically connects the input electrode 2 and the output electrode 3 to each other is provided. The insulating substrate 1 is made of a dielectric material, for example, ceramics such as Pb(ZrTi)O₃ and BaTiO₃. The insulating substrate 1 may be made by laminating insulating sheets. However, since the insulating substrate 1 does not require an internal conductor, the substrate 1 may be made by powder molding, resin molding or resin injection molding.

The electrodes 2, 3, 4a and 4b may be formed on the insulating substrate 1 by a thick film forming method wherein paste of Ag, Ag-Pd or the like is coated by screen printing or the like and dried, or by a thin film forming method such as sputtering, ion plating or vapor deposition.

The resistor 6 may be formed on the insulating substrate 1 by a thick film forming method wherein paste of carbon or cermet is coated by screen printing or the like and dried, or by a thin film forming method such as sputtering or vapor deposition of W or an alloy of Ni and Cr. The resistor 6 has a resistance within a range from scores of ohms to scores of kiloohms.

Figure 4:
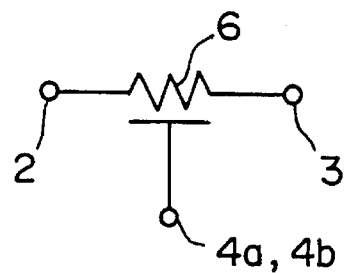
FIG. 4 is an electric equivalent circuit diagram of the electronic device of FIG. 1.

The electronic device of the structure has a capacity between the grounding electrodes 4a, 4b and the resistor 6. The capacity and the resistance of the resistor 6 form an RC circuit. FIG. 4 shows the electric equivalent circuit of the electronic device. This electronic device functions as a noise filter.

This electronic device has no internal conductors inside the insulating substrate 1. As far as a producing method thereof is concerned, a process of providing an internal conductor inside the insulating substrate 1 is not necessary. Accordingly, the insulating substrate 1 does not have distinctive face and reverse side, and it is no longer necessary to distinguish the face on which the resistor 6 is to be formed. An electronic device with an internal conductor has a disadvantage that the inductance of the internal conductor degrades the noise eliminating function in a high frequency area. Since the electronic device of the first embodiment does not have any internal conductors, the noise eliminating function in a high frequency area is better than that of the conventional electronic device.

In a method of producing a conventional electronic device, ceramics and an internal conductor are sintered together to make an insulating substrate, and for prevention of delamination, a kind of ceramics which has a coefficient of thermal expansion nearly equal to that of the internal conductor must be selected as the material of the insulating substrate. However, in the first embodiment, there is no limitation to selection of the material.

Figure 5:
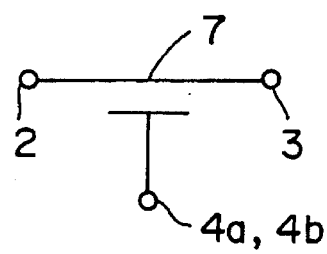
FIG. 5 is an electric equivalent circuit diagram of an electronic device which is a second embodiment of the present invention.

Second Embodiment: FIG. 5

A second embodiment is an electronic device which has a conductor with a high conductivity on the surface of an insulating substrate. The electronic device of the second embodiment has basically the same structure as the first embodiment. Only the difference is that the second embodiment has a conductor with a high conductivity on the substrate, while the first embodiment has a resistor 6. Therefore, the detailed description of the structure of the second embodiment is omitted.

The conductor with a high conductivity on the substrate is formed by coating paste of a well conductive material, for example, Ag, Ag-Pd, Cu or the like, by screen printing or the like and drying the coated paste. FIG. 5 shows the electric equivalent circuit of the electronic device of the second embodiment. By using the conductor 7 as an inductor, the electronic device has an LC circuit.

This electronic device functions as a through capacitor and has the same advantages as the first embodiment.

Figure 6:
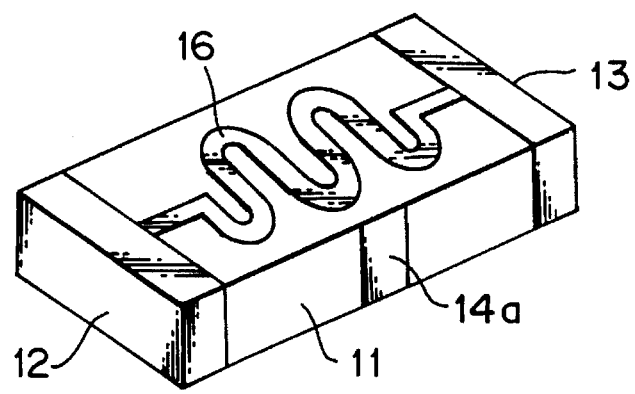
FIG. 6 is a perspective view of an electronic device which is a third embodiment of the present invention.
Figure 7:
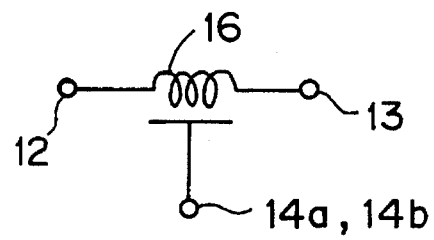
FIG. 7 is an electric equivalent circuit diagram of the electronic device of FIG. 6.
Figure 8:
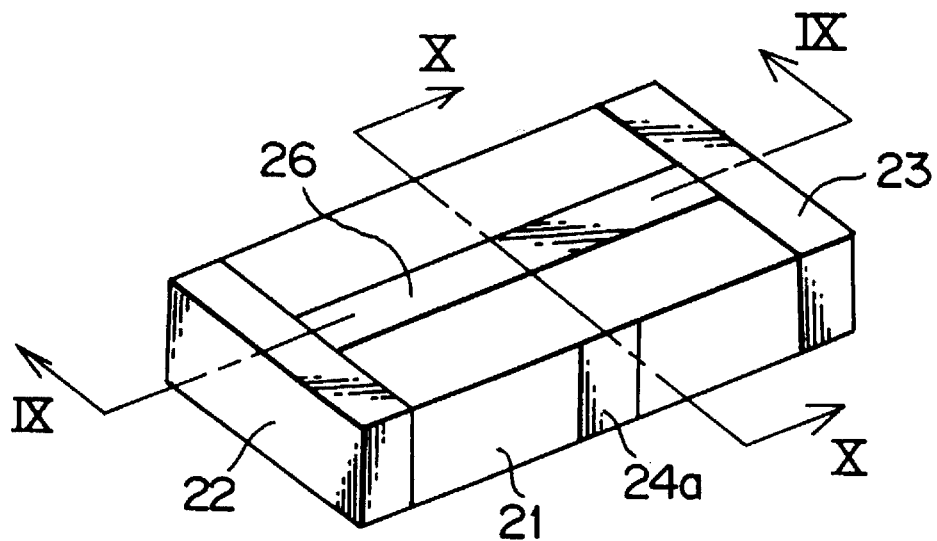
FIG. 8 is a perspective view of a conventional electronic device.
Figure 9:
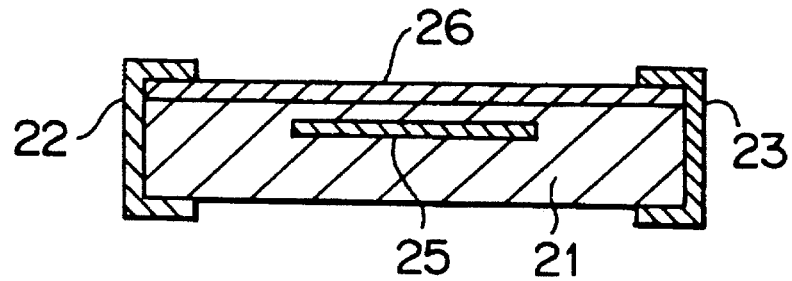
FIG. 9 is a sectional view of the electronic device of FIG. 8, taken along the line IX—IX.
Figure 10:
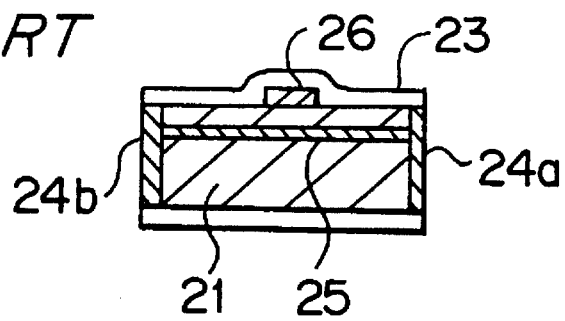
FIG. 10 is a sectional view of the electronic device of FIG. 8, taken along the line X—X.

Third Embodiment: FIGS. 6 and 7

A third embodiment is an electronic device which has a coil conductor on the surface of an insulating substrate. As shown in FIG. 6, a rectangular insulating substrate 11 has an input electrode 12 and an output electrode 13 on both ends (extending from shorter side surfaces to an upper and a lower surface) respectively. On longer side surfaces of the substrate 11, grounding electrodes 14a and 14b are provided in the center. On the upper surface of the substrate 11, a coil conductor 16 which electrically connects the input electrode 12 and the output electrode 13 to each other is provided.

The coil conductor 16, which is snaky, is formed on the substrate 11 by coating paste of a well conductive material, for example, Ag, Ag-Pd, Cu or the like, by screen printing or the like and drying the coated paste.

This electronic device has a capacity between the grounding electrodes 14a, 14b and the coil conductor 16. The capacity and the inductor of the coil conductor 16 form an LC circuit. FIG. 7 shows the electric equivalent circuit of the electronic device of the third embodiment. This electronic device functions as a noise filter and has the same advantages as the first embodiment.

Other Embodiments

With respect to each of the above embodiments, by covering at least the external conductor on the insulating substrate (the conductor with a high conductivity, the resistor or the coil conductor) with an insulating film such as a polyimide film, the external conductor can be protected from shocks applied from outside and humidity, thereby improving the reliability of the electronic device.

The grounding electrodes may be not only disposed on the side surfaces of the insulating substrate but also extended from the side surfaces to the upper surface or the lower surface.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An electronic device comprising:

an insulating substrate;

an input electrode and an output electrode provided on a surface of the insulating substrate apart from each other;

a grounding electrode provided on said surface of the insulating substrate between the input electrode and the output electrode; and a conductor provided on said surface of the insulating substrate which conductor electrically connects the input electrode to the output electrode, a capacity being generated between the grounding electrode and the conductor.

2. An electronic device as claimed in claim 1, wherein the conductor has a high conductivity.

3. An electronic device as claimed in claim 1, wherein the conductor is a resistor.

4. An electronic device as claimed in claim 1, wherein the conductor is a coil.

5. An electronic device as claimed in claim 1, wherein:

the input electrode and the output electrode are disposed on opposite ends of the insulating substrate; and the conductor extends on a surface of the insulating substrate between the input electrode and the output electrode.

6. The electronic device as claimed in claim 1, wherein the grounding electrode is provided at intervals between the input and output electrodes.

7. An electronic device comprising:

an insulating substrate having a first end and a second end, which insulating substrate is devoid of internal conductors;

an input electrode and an output electrode provided on a surface of the first and second ends, respectively;

a grounding electrode provided on a surface of the insulating substrate between the input electrode and the output electrode; and a conductor provided on a surface of the insulating substrate, which conductor electrically connects the input electrode to the output electrode to establish an electromagnetic relationship between the grounding electrode and the conductor.

8. The electronic device of claim 7 wherein:

the insulating substrate has a top surface and a bottom surface, and a front surface and a rear surface; and the conductor is provided on the top surface.

9. The electronic device of claim 8 wherein the grounding electrode is provided on the front surface.

10. The electronic device of claim 8 wherein a grounding electrode is provided on both the front surface and on the back surface.

11. The electronic device of claim 8 wherein a grounding electrode extends to the top or bottom surface.

12. The electronic device of claim 7 wherein the conductor is resistive.

13. The electronic device of claim 7 wherein the conductor has a high conductivity.

14. The electronic device of claim 7 wherein the conductor and the grounding electrode form an RC device.

15. The electronic device of claim 7 wherein the conductor and the grounding electrode form an LC device.

* * * * *